(12) United States Patent
Williams, Sr.

(10) Patent No.: US 6,314,788 B1
(45) Date of Patent: Nov. 13, 2001

(54) GRINDING APPARATUS SHAFT WITH BEARING FAILURE DETECTION AND SECONDARY SUPPORT

(76) Inventor: Robert M. Williams, Sr., 16 La Hacienda, Ladue, MO (US) 63124

(*) Notice: Subject to any disclaimer, the term of this patent is extended or adjusted under 35 U.S.C. 154(b) by 0 days.

(21) Appl. No.: 09/785,763

(22) Filed: Feb. 16, 2001

(51) Int. Cl.⁷ .................................................. G01N 3/56
(52) U.S. Cl. ............................................................ 73/7
(58) Field of Search ........................ 73/7, 865.9; 241/25, 241/301

(56) References Cited

U.S. PATENT DOCUMENTS

| | | |
|---|---|---|
| 4,022,387 | 5/1977 | Williams . |
| 4,184,640 | 1/1980 | Williams . |
| 4,478,371 | 10/1984 | Williams . |
| 4,524,917 | 6/1985 | Williams . |
| 4,640,204 | 2/1987 | Williams . |
| 4,830,290 | 5/1989 | Williams . |
| 5,330,110 | 7/1994 | Williams . |
| 6,119,504 | * 9/2000 | Claus ..................................... 73/7 |

FOREIGN PATENT DOCUMENTS

1328594 * 8/1987 (SU) ........................................ 73/7

OTHER PUBLICATIONS

Williams Direct Fired Systems; Bulletin 970; Index KK; 6 pages; no date.
Williams Direct Fired Systems; Bulletin 930; Index KK; 8 pages; no date.
Williams Direct Fired Systems; Bulletin 930R; Index KK; 8 pages; no date.
Williams Fluid Bed Roller Mill Systems; Bulletin 856R; 12 pages; no date.

* cited by examiner

Primary Examiner—Robert Raevis
(74) Attorney, Agent, or Firm—Polster, Lieder, Woodruff & Lucchesi, L.C.

(57) ABSTRACT

A method and apparatus for determining bearing failure in a grinding mill drive shaft. The drive shaft is comprised of an upper shaft section and removable shaft section operatively connected to a gearbox drive shaft section. A grinding assembly is attached to the upper shaft section. The upper shaft section is supported by a support bearing. The respective drive shaft sections are joined together by couplings. A gap of a predetermined distance is left between the upper shaft section and the removable shaft section within the coupling. The gap between the upper and removable shaft sections periodically is measured. A decrease in the gap indicates support bearing wear. In bearing failure, the upper shaft section rests on the removable shaft section and the couplings hold the shaft together with the couplings and the gearbox drive shaft section supporting the weight.

10 Claims, 2 Drawing Sheets

GRINDING APPARATUS SHAFT WITH BEARING FAILURE DETECTION AND SECONDARY SUPPORT

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention is directed generally to apparatus for grinding material for use in many different commercial activities where the material has a desired size or fineness grade and, more particularly, an improved drive shaft and method that allows for early detection of drive shaft bearing failure and that provides secondary support for the shaft and associated grinding apparatus in the event of bearing failure.

Various prior designs of grinding apparatus or roller grinding mills are known to the art. In general, the grinding apparatus of prior designs include a frame or housing and motor driven roller grinding assembly within the housing to grind material against a surface, sometimes referred to as a bullring. The grinding assembly, often a plurality of grinding rollers, is supported by a central shaft. The shaft usually has at least one supportive bearing assembly adjacent the bottom of the housing. The central shaft, which functions as a drive shaft, is operatively connected to thrust bearing in a gearbox and the gearbox is operatively associated with an electric motor, often via a clutch. The basic grinding apparatus may be associated with other peripheral apparatus such as separators, dryers and so forth. Examples of the inventor's prior grinding apparatus include U.S. Pat. Nos. 5,839,673; 5,611,494; 5,383,612; 4,830,290; 4,640,204; 4,522,343; 4,478,371; 4,184,640; 4,022,387; and 3,337,142.

In prior art grinding apparatus having drive shafts, failure of the support bearing could result in the shaft and, consequently the grinding assembly, slipping downward resulting in grinding mill failure. In most cases, there is no forewarning of bearing failure, which may result in the operator waiting to replace the bearings until after failure or to prematurely replace the bearings as a preventative measure. In the event the user wants to replace the bearings before complete bearing failure, the gearbox must be removed, the grinding assembly suspended within the housing, and the shaft lowered to allow access to the bearing. In some prior art roller grinding mills, which are not constructed to permit the removal of the shaft and bearing directly out of the bottom of the mill after removal of the gearbox, the entire mill must be disassembled to remove the shaft and bearing.

SUMMARY OF THE INVENTION

In accordance with the invention, briefly stated, a method is provided that allows the operator to determine roller grinding mill drive shaft support bearing failure before there is complete failure, and that allows for support of a grinding assembly in the presence of support bearing failure to allow the roller grinding mill to continue to function. The shaft includes a removable shaft section between an upper shaft section and the upwardly extending gearbox drive shaft, The removable shaft section is attached to the upper shaft section and to the gearbox drive shaft by removable couplings. A shaft driven roller grinding assembly is attached to the upper shaft section. The upper shaft section is supported by a thrust bearing. The upwardly extending gearbox drive shaft is operatively connected to a thrust bearing in the gearbox. A gap of a predetermined tolerance or dimension is left between the lower end of the upper shaft section and the upper end of the removable shaft section within the coupling. The coupling can be partially opened or removed and the gap between the shaft sections measured. A decrease in the gap size indicates that the upper shaft section is sliding down, thereby indicating support bearing wear or failure prior to total failure of the support bearing.

In the event the support bearing does fail, the upper shaft section, with the grinding assembly attached thereto, will slide downward until the gap between the upper and removable shaft sections is closed and the upper shaft section comes to rest on the removable shaft section. The couplings between the upper shaft section and the removable shaft section, and between the removable shaft section and the gearbox drive shaft, hold the drive shaft together. The weight of the grinding assembly is distributed to, and thus supported by, the couplings and the gearbox drive shaft. Due to the predetermined gap between the upper and removable shaft sections, the distance that the upper shaft section can slide down is limited. Consequently, the distance the grinding assembly can drop within the housing is limited so as to allow bottom clearance for the grinding assembly to operate, even in the presence of support bearing failure. To replace worn support bearings, the couplings are released and the removable shaft section is removed creating clearance between the upper shaft and the gearbox. This aspect of the invention allows access to the bearings without the necessity of moving the gearbox.

The foregoing and other objects, features, and advantages of the invention as well as presently preferred embodiments thereof will become more apparent from the reading of the following description in connection with the accompanying drawings.

DESCRIPTION OF THE PREFERRED EMBODIMENT

Figure 1:
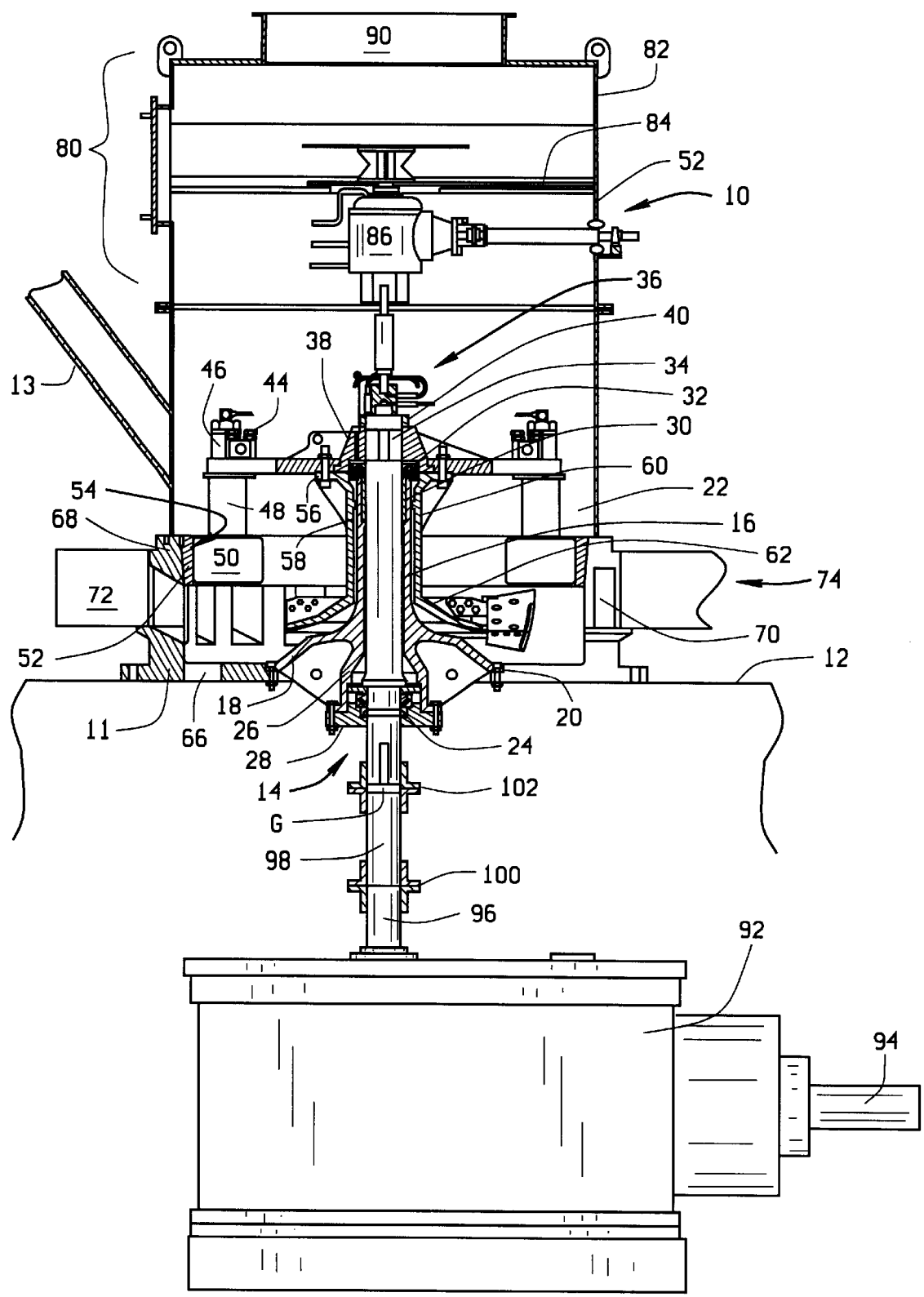
FIG. 1 is perspective view of a grinding mill and separator employing the drive shaft employed in the method the present invention.
Figure 2:
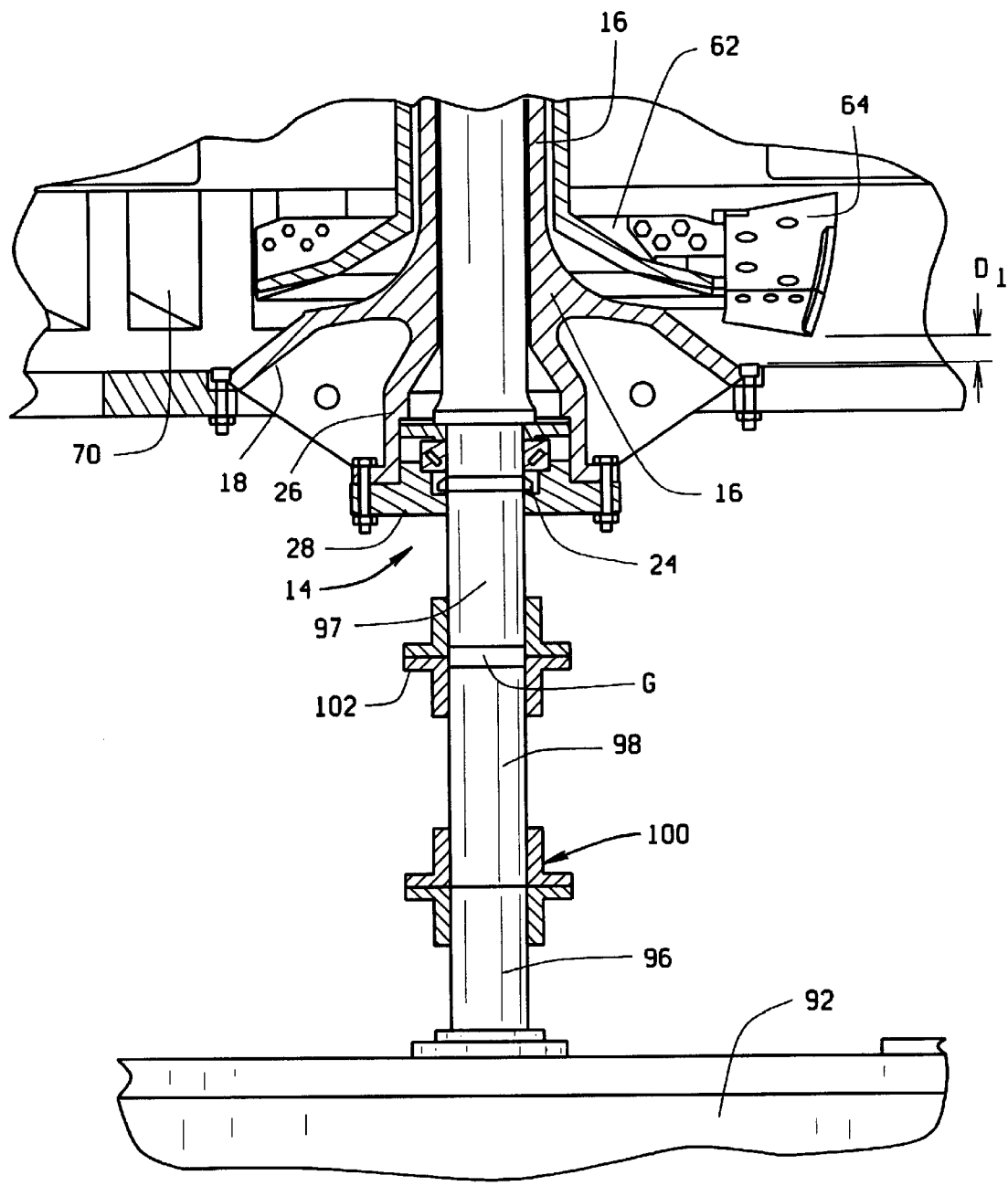
FIG. 2 is an enlarged perspective view of the grinding mill drive shaft employed in the method the present invention

The present roller mill assembly seen in FIGS. 1 and 2 embodies a main frame structure 10 formed with a mounting flange 11 by which the frame may be supported on a suitable base 12. The main frame structure includes a material feed tube 13 for introduction of material into the grinding apparatus. A drive shaft 14 extends vertically upward through a fixed column 16, which is formed with a bell bottom wall 18, having its circumferential lip 20 mounted in the frame 10 for support and to close the bottom of a grinding chamber 22.

The shaft 14 is supported in a thrust bearing assembly 24 carried in a socket 26 depending from the underside of the bell bottom wall 18. The socket is closed by a removable closure plate 28. As the drive shaft 14 passes upwardly through the column 16 it is stabilized by a guide sleeve 30 supported on a rib projecting inwardly to support the sleeve. A seal element is held in place on the rib at the lower end of the sleeve 30. The upper end of the column 16 is provided with a lubrication reservoir 32 surrounding the portion of the shaft just below its projecting end 34. A head member in the form of a spider structure 36 has a central hub 38 engaged on the end 34 of the shaft 14 and is held in place by a nut 40 so that the head member 36 rotates with the shaft 14.

The head member 36 has a plurality of arms 42 (two being shown in FIG. 1). Each arm carries bearings 44 and a hanger trunnion 46 is pivotally carried by bearing 44 for the purpose of supporting a hanger shaft 48 for carrying a grinding roller 50 at a predetermined level. The level of the grinding rollers 50 is surrounded by a bull ring 52 which is fixed in a tapered seat in the frame 10 and presents an inward grinding face 54 to the rollers 50.

Head member 36 is attached at its underside to the top flange 56 of a tubular shaft 58 which surrounds the column 16 and has a stabilizing shoulder 60 engaged about the column 16. The lower end of the tubular shaft 58 is flared outwardly to provide arms 62 to support plow blades 64. The arms are orientated relative to the grinding rollers 50 so that a flow precedes a grinding roller 50 so that the material to be ground will be thrown upwardly into the path of travel of the rollers 50 at the level of the bull ring 52. Thus, the plows 64 rotate in a space below the grinding rollers 50, such space having its bottom defined by the bell bottom wall 18. There is a predetermined clearance D1 between the plows 64 and the bell bottom wall 18. An aperture 66 is provided in the bottom of this space for the discharge of a portion of the material being processed, such as tramp metal and hard to grind components.

In operation, it can be understood that each hanger shaft 48 and its roller is free to pivot radially inward toward the center column 16, and the roller is forced by centrifugal action upon rotation of the shaft 14 and head member 36 toward the fixed bull ring 52. It is undesirable to allow the roller 50 to engage the bull ring. This normally is prevented by the bed of grindable material in the area provided by the plow 64 or oversized feed material and the gas fluidized ground material that has recycled. If contact is obtained the result is vibration and noise of an extreme intensity such that the mill will self-destruct if not shut down.

It can be seen that the grinding chamber 22 is enclosed by the wall 68 of the frame structure 10. The frame 10 includes an access door (not shown) for access to the previously described grinding apparatus. The frame 10 is formed with a plurality of openings 70 which connect the chamber 22 with a wind box or air bustle 72 which surrounds and encloses the frame 10, at least at the level of the openings 70. Air is admitted to the bustle 72 at inlet 74. As is described in U.S. Pat. No. 4,522,343 to Williams, the arrangement of air directing passages secured to each opening 70 is selected so as to cause the airflow to spin in a clockwise direction, imparting a centrifugal force or horizontal component to the particulate material in the chamber to lift it upward between the rollers 50 and the bull ring 52.

In the illustrated embodiment, output of the grinding chamber is delivered to a spinner separator 80 wherein the larger particles are caused to move to the outer wall 82 by the centrifugal fan action of the blades 84 driven by a gear mechanism 86 from an external motor (not shown). The larger particles thus separated fall by gravity back into the grinding chamber 22 and re-enter the mass of material being moved by the spinning action of the air inducted through the openings 70 through the orbit of the rollers 50 at the bull ring 52. The material of desired micronized fineness is discharged by outlet 90 and conveyed by a suitable blower (not shown) to a place of use.

Turning now to the drive apparatus, and particularly FIG. 2, it will be appreciated that shaft 14 is operatively connected to a gearbox 92 which, in turn, is operatively connected to a drive motor (not shown) via shaft 94 (FIG. 1). The gearbox 92 includes and upwardly extending gearbox drive shaft 96. Gearbox drive shaft 96 is associated with a thrust bearing (not shown) within the gearbox 92. The drive shaft 14 is comprised of an upper shaft section 97, a removable shaft section 98 and the gearbox drive shaft 96. The lower end of the removable shaft section 98 is attached to the upper end of gearbox drive shaft 96 by coupling 100. Likewise, the upper end of the removable shaft section 98 is attached to the lower end of upper shaft section 97 by coupling 102. It will be appreciated that couplings 100 and 102 can be commercially available couplings such as the Type T10 Steelflex® Coupling (The Falk Corporation, Milwaukee, Wis.) which are comprised of two halves which encircle the shaft junctures. Consequently, the upwardly extending gearbox drive shaft 96, the removable shaft section 98, and the upper shaft section 97 cooperate to form one continuous drive shaft 14 for driving the roller grinder assembly relative to the bull ring 52.

Referring again to FIG. 2, it will be appreciated that a gap G is left between shaft 14 and removable shaft section 98. In generally the gap measures approximately one fourth (¼) inch. It will be appreciated that the width of gap G is less than the clearance distance D1 between the plows 64 and bell bottom 18. The provision of gap G of a predetermined width allows the operator to detect wear and or failure of bearing 24 as follows. Periodically, the operator of the roller mill removes half of coupling 102 and measures gap G. A decrease in the gap G indicates that the upper shaft section 97 is slipping downward due to wear or failure of bearing 24. By detecting bearing wear in this manner, the operator can replace the bearing before total bearing failure occurs. However this design offers another advantage. That is, in the event the bearing fails completely, the upper section of the shaft slips downward, closing gap G, and coming to rest on removable shaft section 98. The entire shaft and grinding assembly then is supported by gearbox shaft 96. Because the width of gap G is less that the clearance D1, enough clearance remains for the plows to clear the bottom wall, thereby allowing the grinding mill to function even in the presence of bearing failure. Moreover, to remove or replace bearing 24, couplings 100 and 102 are opened, and removable shaft section 98 removed. Shaft 14 can be appropriately lowered and secured to provide access to bearing 24 without the need to move the gearbox 92 to provide such clearance.

It will be appreciated by those skilled in the art that various changes and modifications can be made in the shaft and method of determining bearing wear without departing from the scope of the appended claims. Therefore, the forgoing description and accompanying drawings are intended to be illustrative only, and should not be construed in a limiting sense.

What is claimed is:

1. In a roller grinding mill having a housing, a grinding apparatus within the housing operatively attached to a drive shaft supported by a bearing, the drive shaft having an upper shaft section and a removable shaft section attached thereto by a coupling, there being a gap of a predetermined dimension between the upper shaft section and removable shaft section within the coupling, a method of determining wear or failure of the bearing comprising:

opening said coupling between said upper shaft section and said removable shaft section; and measuring the dimension of the gap between the upper shaft section and removable shaft section, wherein a decrease in the predetermined dimension of the gap resulting from downward movement of the upper shaft section indicates wear or failure of the bearing.

2. The method of claim 2 wherein the removable shaft section is connected to a gearbox drive shaft by a second coupling.

3. The method of claim 1 wherein the predetermined dimension of the gap between the upper shaft section and the removable shaft section is approximately one-fourth (¼) inches.

4. A roller grinding mill comprising;

a housing having a bottom wall;

a grinding apparatus operatively connected to a drive shaft within the housing, said grinding apparatus operatively positioned at a predetermined distance above the bottom wall, the drive shaft having an upper shaft section and a spaced apart removable shaft section, said upper shaft section and said removable shaft section defining a space of a predetermined dimension there between;

a bearing to support said drive shaft;

a removable coupling surrounding said space of a predetermined dimension between the upper shaft section and said removable shaft section to connect said removable shaft section to said upper shaft section, whereby an operator can intermittently remove said coupling and measure the predetermined dimension of the space between the upper shaft section and the removable shaft section, wherein a decrease in the predetermined dimension of the space between the upper shaft section and removable shaft section indicates vertical displacement of the upper shaft section due to wear or failure of said shaft supporting bearing.

5. The roller grinding mill of claim 4 wherein said removable shaft section is connected to a drive shaft of a gearbox by a second removable coupling, said upper shaft section, said removable shaft section and said gearbox drive shaft comprising a support between the gearbox and said grinding apparatus whereby the gearbox supports the grinding apparatus during bearing failure.

6. The roller grinding mill of claim 1 wherein said predetermined distance of the grinding apparatus above a bottom wall is greater than the predetermined dimension of the space between the upper shaft section and the removable shaft section.

7. The roller grinding mill of claim 1 wherein said predetermined dimension of the space between the upper shaft section and the removable shaft section is approximately one-fourth (¼) inch.

8. A roller grinding mill comprising;

a housing having a bottom wall;

a grinding apparatus operatively connected to a drive shaft within the housing, said grinding apparatus operatively positioned at a predetermined distance above the bottom wall;

a bearing to support said drive shaft; and means for determining failure of the bearing by measuring vertical displacement the drive shaft.

9. The roller grinding mill of claim 8 wherein the means for determining bearing failure further comprises the drive shaft having an upper shaft section and a spaced apart removable shaft section, said upper shaft section and said removable shaft section defining the space of a predetermined dimension there between to allow measurement of vertical displacement of the drive shaft.

10. The roller grinding mill of claim 9 further comprising a removable coupling surrounding said space of a predetermined dimension between the upper shaft section and said removable shaft section to connect said removable shaft section to said upper shaft section whereby an operator can remove said coupling and measure the predetermined dimension of the space between the upper shaft section and the removable shaft section, wherein a decrease in the predetermined dimension of the space between the upper shaft section and removable shaft section indicates wear or failure of said shaft supporting bearing.

* * * * *